(12) United States Patent
Kesterson et al.

(10) Patent No.: US 8,791,647 B2
(45) Date of Patent: Jul. 29, 2014

(54) PREDICTIVE CONTROL OF POWER CONVERTER FOR LED DRIVER

(75) Inventors: John William Kesterson, Seaside, CA (US); Xiaoyan Wang, Milpitas, CA (US); Xuecheng Jin, Palo Alto, CA (US); Enzhu Liang, Pacifica, CA (US); Selcuk Sen, Mountain View, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 253 days.

(21) Appl. No.: 13/339,196

(22) Filed: Dec. 28, 2011

(65) Prior Publication Data
US 2013/0169172 A1 Jul. 4, 2013

(51) Int. Cl.
*G05F 1/00* (2006.01)
(52) U.S. Cl.
USPC ........................................................ 315/291
(58) Field of Classification Search
USPC .................. 315/291, 224, 246, 307, 308
See application file for complete search history.

(56) References Cited

U.S. PATENT DOCUMENTS

| | | | |
|---|---|---|---|
| 7,880,400 B2* | 2/2011 | Zhou et al. | 315/247 |
| 8,018,171 B1* | 9/2011 | Melanson et al. | 315/194 |
| 8,049,439 B2* | 11/2011 | Zhao et al. | 315/297 |
| 2009/0322234 A1 | 12/2009 | Chen et al. | |
| 2011/0012519 A1* | 1/2011 | Zhao | 315/185 R |
| 2011/0062872 A1 | 3/2011 | Jin et al. | |
| 2011/0187276 A1* | 8/2011 | Shteynberg et al. | 315/186 |
| 2011/0193491 A1* | 8/2011 | Choutov et al. | 315/291 |

* cited by examiner

*Primary Examiner* — Minh D A
(74) *Attorney, Agent, or Firm* — Fenwick & West LLP (57) ABSTRACT

A system controls a switching power converter to power LED strings using a predictive feedforward control mechanism. An LED controller determines programmed current levels and duty cycles for driving LED strings. The LED controller determines a predicted load for a subsequent cycle of a switching power converter driving the LED strings based on the programmed current levels and duty cycles. A power conversion controller uses the predicted load information to control switching of the switching power converter. This improves the dynamic response of the switching converter to changing load conditions, thereby improving overall power efficiency and performance of the system.

25 Claims, 6 Drawing Sheets

PREDICTIVE CONTROL OF POWER CONVERTER FOR LED DRIVER

BACKGROUND OF THE INVENTION

1. Field of the Invention

The present invention relates to driving LEDs (light-emitting diodes) and, more specifically, to a system for driving multiple strings of LEDs.

2. Description of the Related Arts

LEDs are being adopted in a wide variety of electronics applications, for example, architectural lighting, automotive head and tail lights, backlights for liquid crystal display devices including personal computer, laptops, high definition TVs, flashlights, etc. Compared to conventional lighting sources such as incandescent lamps and fluorescent lamps, LEDs have significant advantages, including high efficiency, good directionality, color stability, high reliability, long life time, small size, and environmental safety.

LEDs are current-driven devices, meaning that the luminous flux (i.e. brightness) generated from them is primarily a function of the current applied through them. Thus regulating the current through the LEDs is an important control technique. To drive a large array of LEDs from a direct current (DC) voltage source, DC-DC switching power converters such as a boost or buck-boost power converters are often used to supply the top rail voltage for several strings of LEDs. In Liquid Crystal Display (LCD) applications using LED backlights, it is often necessary for a controller to control several strings of LEDs in parallel with independent current settings for each string. The controller can then independently control the brightness of different sections of the LCD. Furthermore, the controller can turn different parts of the LCD on or off in a timed manner.

Figure 1:
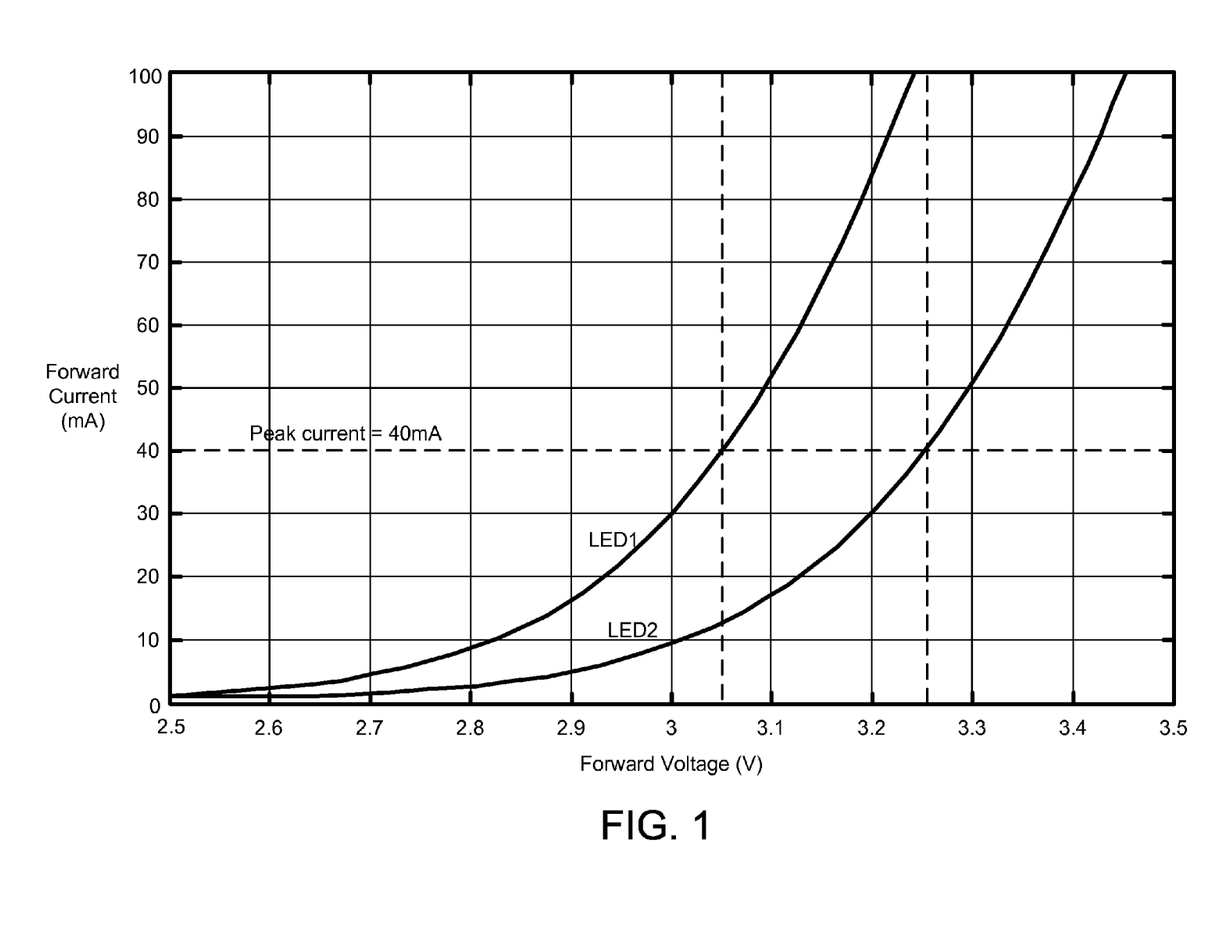
FIG. 1 is a plot illustrating the effects of the manufacturing differences on the I-V curves of forward biased LEDs.

Due to manufacturing differences between the LEDs, the voltage drop across each LED string necessary to maintain a specified current level varies considerably. The VI curve of FIG. 1 illustrates the exponential relationships between voltage and current for two different LEDs (LED1 and LED2). For LED1 and LED2 to provide the same amount of peak current, LED1 must operate at a forward voltage drop of about 3.06 volts, while LED2 must operate at a forward voltage drop of about 3.26 volts. Assuming there are 10 LEDs having the characteristics of LED1 in a first LED string, there is a 30.6 V drop across the string. Assuming there are 10 LEDs having the characteristics of LED2 in a second LED string 102, there is a 32.6 V drop across the second LED string. This difference of 2 volts will therefore be dissipated by circuitry driving the second string such that both strings operate at the same peak current of 40 mA.

The unpredictable VI characteristics of different LEDs makes it difficult to operate different LED strings in a power efficient manner while still maintaining precise control over the brightness of the LED strings. Different techniques have been developed to address this challenge, but many conventional solutions are either inefficient or require the use of additional circuitry that substantially increases the cost of the components used to regulate current through the LED strings.

SUMMARY OF THE INVENTION

A switching power converter controller controls switching of a power converter using a predictive feed forward control mechanism that estimates a predicted load for a subsequent switching cycle of the power converter. In one embodiment, a predicted load signal is received during a first switching cycle of the switching power converter. The predicted load signal represents a predicted load of the one or more LED strings during a second switching cycle of the switching power converter occurring subsequent to the first switching cycle. A duty cycle is determined for driving the switching power converter during the second switching cycle based on the predicted load. The switching power converter is controlled during the second switching cycle using the duty cycle to achieve a regulated output voltage powering the one or more LED strings.

Embodiments also include a system for driving one or more LED strings. The system comprises an LED controller and power conversion controller. The LED controller is coupled to receive a brightness setting for driving the one or more LED strings. The LED controller generates a predicted load signal representing a predicted load of the one or more LED strings operating at the brightness setting. The power conversion controller is coupled to receive the predicted load signal from the LED controller during a first switching cycle of the switching power converter. The power conversion controller generates a control signal based on the predicted load signal. The control signal has a duty cycle for controlling switching of a switching power converter during a second switching cycle occurring subsequent to the first switching cycle. The switching power converter provides power to the one more LED strings.

Beneficially, the power conversion controller utilizes the predictive load signal to control switching of the switching power converter rather than relying entirely on feedback regulation. This improves the dynamic response of the switching power converter when adjusting to changing load conditions of the LED strings. The improved dynamic response reduces or eliminates performance problems such as flickering that may occur when the output voltage drops below the regulation voltage during transient conditions. Furthermore, the improved dynamic response reduces or eliminates unwanted power dissipation that may occur when the output voltage rises above its regulation voltage during the transient conditions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

System Architecture

Figure 2:
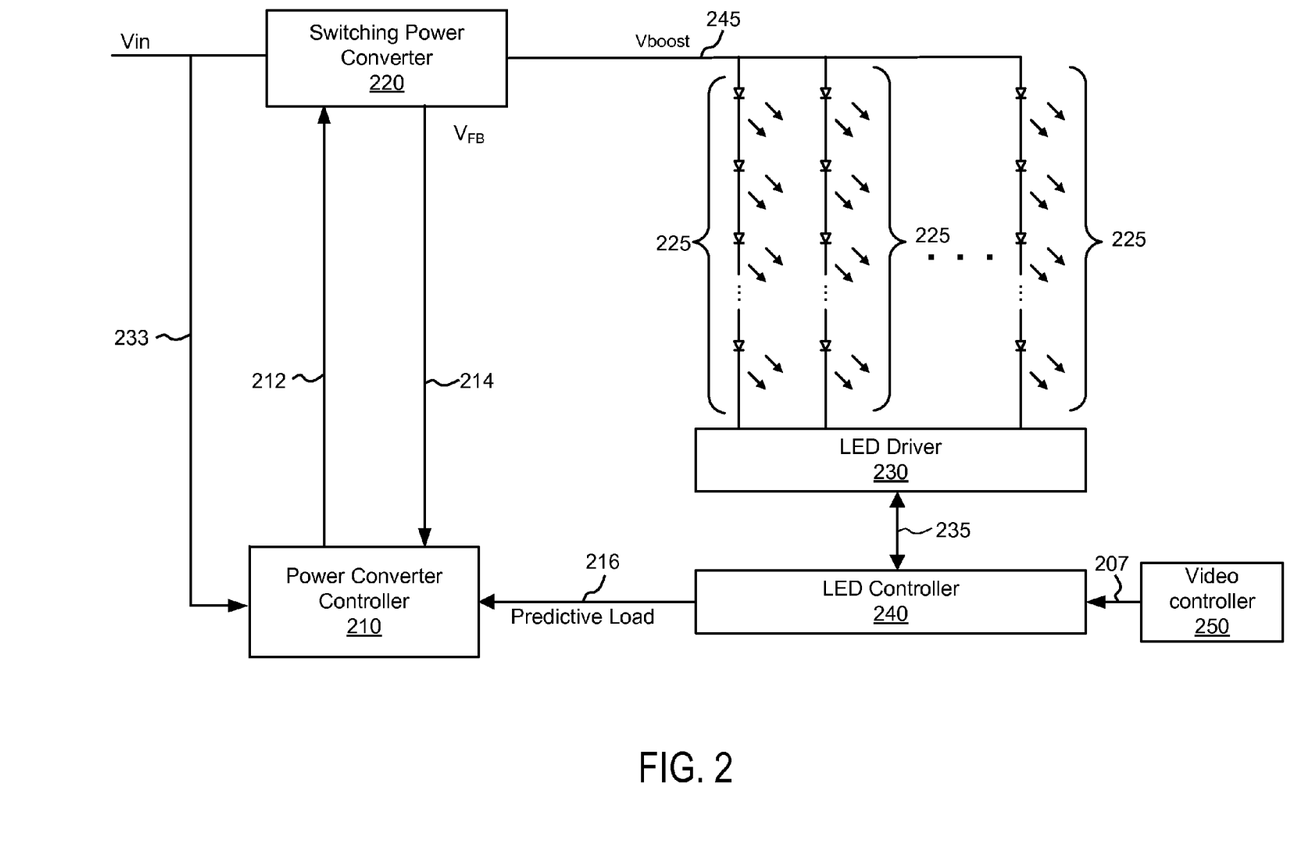
FIG. 2 illustrates a high level system for driving multiple strings of LEDs.

FIG. 2 illustrates one embodiment of a system for driving multiple strings of LEDs 225. The system comprises an LED driver 230, an LED controller 240, a video controller 250, a power converter controller 210, and a switching power converter 220. Alternative embodiments may include different or additional components.

Video controller 250 may be, for example, a device that controls an LCD display to form an image. Video controller 250 determines the desired backlighting requirements for the LCD display, which it transmits to LED controller 240 via control signal 207. For example, in one embodiment, control signal 207 comprises brightness settings for LED strings 225 and a predetermined baseline current for the LED strings 225. Generally, video controller 250 updates control signal 207 once per vertical synchronization (Vsync) cycle of video controller 250. Although shown as two separate devices, in one embodiment, video controller 250 and LED controller 240 may be separate components of the same integrated circuit device or separate threads in the firmware executing on the same integrated circuit device.

LED controller 240 receives control signal 207 from video controller 250 and determines the current levels and duty cycles (i.e. on/off times) for driving LED strings 225 to achieve the desired brightness specified by video controller 250. The programmed current levels and duty cycles are communicated to LED driver 230 via signal 235, which drives LED strings 225 according to the communicated settings. LED controller 240 may specify different settings for different LED strings 225, thus allowing LED driver 230 to achieve different brightness values for different LED strings 225.

LED controller 240 and LED driver 230 communicate with each other through a communication link 235. In one embodiment, communications link 235 may represent any serial or parallel link connecting two or more integrated circuit devices to carry information. For example, communication link 235 may be a serial protocol interface (SPI), an inter-integrated circuit bus (I2C), etc. Communications link 235 may also represent an aggregation of individual communication links where each link is dedicated to carrying one type of information (e.g., duty cycle settings, programmed current level, or regulation information).

LED controller 240 and LED driver 230 operate using adaptive switching as a technique to efficiently drive multiple strings of LEDs 225. For example, in one embodiment, LED controller 240 receives regulation information from the LED driver 230 via communication link 235 indicating whether the current flowing through an LED channel 225 is in or out of regulation. During a calibration process, LED controller 240 uses the regulation information to determine a programmed current value for each of the LED channels 225. In one embodiment, the programmed current is selected from a limited set of possible current values relative to the baseline current. Each LED channel 225 may have a different programmed current value, which is set to optimize power efficiency for that channel based on varying I-V characteristics of different LED strings 225.

Using the predetermined baseline current setting, brightness settings, and the programmed current levels, LED controller 240 calculates duty cycles for LED channels 225. Different duty cycles may be programmed for different channels to compensate for the variations between the programmed current values of each LED channel 225 and to maintain control over the relative brightness of each LED channel 225. For example, LED strings 225 with higher peak current values will have lower duty cycles, and LED strings 225 with lower peak current values will have higher duty cycles. Additional details regarding operation of LED driver 230 and LED controller 240 using adaptive switching are provided below with respect to FIG. 4.

LED controller 240 also generates a predictive load signal 216 based on the known programmed current levels and duty cycles for each LED string 225, and outputs predictive load signal 216 to power converter controller 210. The predictive load signal 216 includes information from which appropriate control signals can be derived for controlling Vboost in subsequent switching cycles of the switching power converter 220. In one embodiment, for example, predictive load signal 216 is representative of an average cumulative current through LED strings 225 over the course of a switching cycle of switching power converter 220, or information from which the average cumulative current can be derived. Alternatively, predictive load signal 216 can be representative of an estimated power that will be dissipated by the LED strings 225 over a predefined time period, or other information from which the estimated power can be derived. The predictive load signal 216 enables power converter controller 210 to more efficiently adjust the output of the switching power converter 220 to compensate for load variations, as will be described in further detail below.

Switching power converter 220 regulates an input voltage $V_{in}$ and provides a common voltage Vboost 245 to multiple LED strings 225. In a feedback path, power converter controller 210 senses a feedback voltage($V_{FB}$) 214 from switching power converter 220 that is representative of the output voltage Vboost 245 of switching power converter 220, and provides a control signal 212 to control switching of switching power converter 220 in order to maintain Vboost 245 at a desired regulation voltage. For example, in one embodiment, control signal 212 comprises a Pulse Width Modulation (PWM) signal that controls switching of switching power converter 220. Alternatively, control signal 212 comprises a Pulse Frequency Modulation (PFM) signal. Thus, if Vboost 245 begins to fall below its regulation voltage (because, for example, the load demand of the LED strings 225 increases), power converter controller 210 will sense the voltage drop of Vboost 245 via feedback signal 214 and increase the duty cycle of control signal 212, thus counteracting the drop in Vboost 245. Similarly, if Vboost 245 rises above its regulation voltage (because, for example, the load demand of the LED strings 225 decreases), power converter controller 210 will sense the voltage rise via feedback signal 214 and decrease the duty cycle of control signal 212, thus counteracting the rise in Vboost 245.

As discussed above, the programmed currents and duty cycles (and therefore overall load requirements) of LED strings 225 may change from cycle to cycle depending on the brightness settings set by video controller 250. For example, in one embodiment, the programmed currents and duty cycles are updated once per Vsync cycle of video controller 250. While the feedback control mechanism of power converter controller 210 discussed above will act to counteract rises or falls in Vboost 245 resulting from changing load demands, the dynamic load response time can be improved by further adjusting the duty cycle of the switching power converter 220 based on feed forward predictive load signal 216. Predictive load signal 216 provides power converter controller 210 with advance information estimating the expected load during a subsequent switching cycle of switching power converter 220. Thus, power converter controller 210 can adjust control signal 212 in anticipation of the changing load without waiting for load change to be discovered via a rise or fall in Vboost 245 (sensed via feedback voltage 214). As a result, the loop response to the dynamic load can be significantly improved.

In one embodiment, LED controller 240 updates predictive load signal 216 whenever adjusted brightness settings are received from video controller 250 (e.g., once per Vsync cycle). Alternatively, LED controller 240 may update predictive load signal 216 each switching cycle of switching power converter 220, every second switching cycle, every third switching cycle, etc with the predictive information corresponding to a subsequent cycle. Thus, for example, a predictive load signal 216 received during a first switching cycle provides information for controlling switching power converter 220 during a second switching cycle sometime after the first switch cycle. An example process for determining the predictive load signal 216 is described in further detail below with reference to FIGS. 3A-3B.

In one embodiment, the predictive load signal 216 may be used in conjunction with a system that has both first and second order control. For example, in a television backlighting system that uses scan mode of operation, first order brightness control is achieved by the PWM duty cycle, and the second order brightness control is achieved based on the scan duty cycle of lower frequency. Current is conducted through the LED strings 225 only when both first and second order controls are asserted. For example, assume a Vsync period of 120 Hz and a PWM frequency of 2.4 KHz. If the PWM duty cycle is set to 50%, and the scan duty cycle is initially set to 100%, this would result in 20 PWM pulses of 50 percent duty cycle over the duration of the Vsync period, resulting in an average current of 50% of some programmed value. Then, if the scan duty is adjusted to 50% for a subsequent Vsync period, there would only be 10 PWM pulses of 50% duty cycle over the duration of the Vsync period, resulting in an average current of only 25% of the programmed value. Thus, in one embodiment, the predictive load signal 216 may incorporate predictive information based on both first and second (and/or even higher order) brightness control according to the same principles described herein.

There are several benefits to the improved dynamic load response achieved by the predictive feedfoward architecture. First, the improved load response can reduce or prevent LED flickering that may result when Vboost 245 falls below the regulation voltage due to increased load demand. Second, the improved load response can reduce or eliminate unwanted power dissipation that may result when Vboost 245 rises above the regulation voltage due to decreased load demand. Third, a smaller output capacitor can be used in the switching power converter 220 without sacrificing performance because the improved load response compensates for larger voltage swings of Vboost 245 typically associated with a decreased output capacitance. Using a smaller output capacitance of the boost converter 220 is often desirable because it lowers the bill of materials cost and further increases the power plant bandwidth so that the loop control can do even more of the work in keeping the regulation.

In one embodiment, LED controller 240 and LED driver 230 are distinct (i.e. separate and different) integrated circuit devices. In other words, LED controller 240 is not a part of the same integrated circuit device as LED driver 230. Alternatively, LED controller 240 and LED driver 230 may be integrated within the same integrated circuit. Furthermore, in one embodiment, LED controller 240 and power converter controller 210 are included within the same integrated circuit device. In this embodiment, the arithmetic processing unit for the various operations performed by power converter controller 210 and LED controller 240 can be shared, thus reducing overall cost of the system.

Operation of Power Conversion Controller and Switching Converter

Figure 3A:
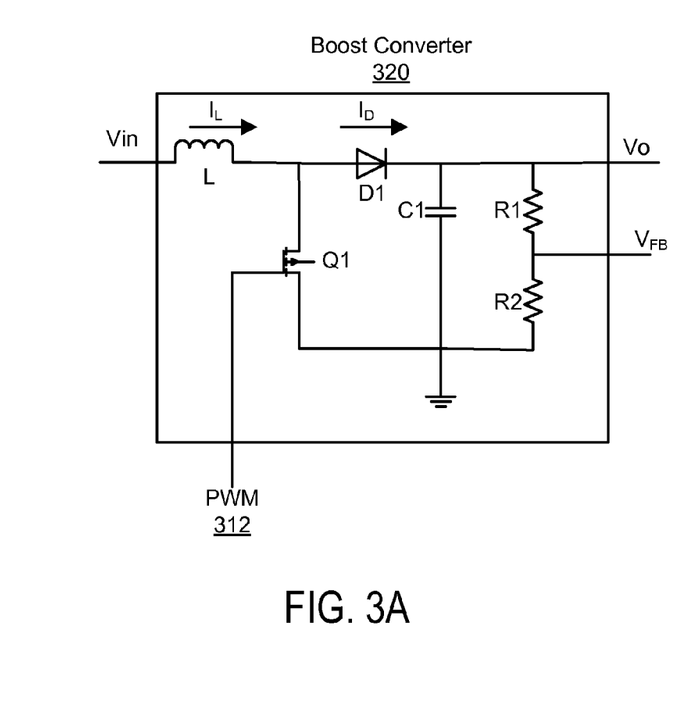
FIG. 3A illustrates a circuit diagram for an embodiment of a switching converter.

FIG. 3A illustrates an example architecture of a boost converter 320 that can be used as switching power converter 220. In a boost converter 320, energy is stored in inductor L when switching transistor Q1 is turned on. When switching transistor Q1 turns off, the energy is transferred to capacitor C1 via diode D1 and is seen as an output voltage $V_O$. A voltage divider comprising resistors R1 and R2 are coupled to produce a sensed feedback voltage $V_{FB}$ representative of $V_o$. $V_{FB}$ may be utilized as feedback voltage 214 and $V_o$ may be coupled to provide Vboost.

Figure 3B:
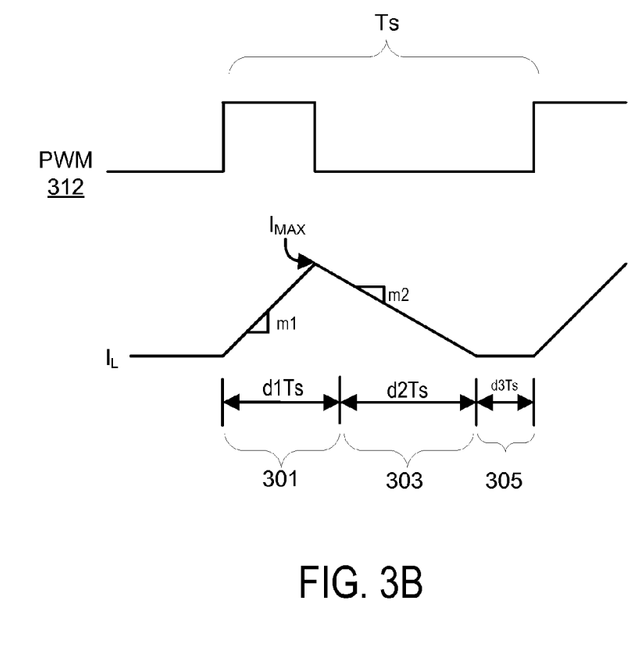
FIG. 3B illustrates waveforms associated with a switching converter operating in a discontinuous conduction mode (DCM).

FIG. 3B illustrates waveform diagrams for a PWM signal 312 driving boost converter 320 and an inductor current $I_L$ through boost converter 320 when operating in a discontinuous conduction mode (DCM). During time period 301, PWM signal 312 is asserted, turning on switching transistor Q1. Inductor current $I_L$ increases at a rate $m_1$ as inductor L charges. Time period 301 is known as the charge time and is given by $d_1 T_S$, where $d_1$ is a duty cycle of PWM signal 312 and $T_S$ is the period of PWM signal 312. During time period 303, PWM signal 312 is low, turning off switching transistor Q1. Inductor current $I_L$ decreases at a rate of $m_2$ as inductor L discharges, thereby providing diode current $I_D$ and producing output voltage $V_O$ across capacitor C1. Time period 303 is known as the discharge time, and is given by $d_2 T_S$ where $d_2$ is a percentage of period $T_S$ when inductor L is discharging. During time period 305, inductor current $I_L$ is approximately zero because inductor L has completely discharged. Time period 305 is known as the dead time, and is given by $d_3 T_S$ where $d_3$ is a percentage of period $T_S$ when the inductor current is zero, after the discharge cycle and before the start of the next PWM cycle.

As can be seen from FIGS. 3A and 3B, the maximum current $I_{MAX}$ through inductor L is given by:

$$I_{MAX} = d_1 T_s m_1 = d_2 T_s m_2 \qquad (1)$$

During charge time 301, Q1 is on and the voltage across inductor L is $V_{in}$. Therefore, $m_1$ is given by:

$$m_1 = \frac{V_{in}}{L} \qquad (2)$$

During discharge time 303, Q1 is off and the voltage across inductor L is $V_o - V_{in}$. Therefore $m_2$ is given by:

$$m_2 = \frac{V_o - V_{in}}{L} \qquad (3)$$

Solving for $d_2$ and substituting for $m_1$ and $m_2$ yields:

$$d_2 = \frac{d_1 T_s m_1}{T_s m_2} = \frac{d_1 m_1}{m_2} = \frac{d_1 V_{in}/L}{(V_o - V_{in})/L} = \frac{d_1 V_{in}}{(V_o - V_{in})} \qquad (4)$$

The average diode output current $\langle I_D \rangle_{T_S}$ over period $T_S$ is then given by:

$$\langle I_D \rangle_{T_S} = \frac{I_{MAX}}{2} d_2 = \frac{d_1 T_s m_1}{2} \frac{d_1 V_{in}}{(V_o - V_{in})} = \frac{d_1^2 T_s V_{in}^2}{2L(V_o - V_{in})} \qquad (5)$$

Solving for $d_1$ yields:

$$d_1 = \frac{1}{V_{in}} \sqrt{\frac{2L}{T_s} \langle I_D \rangle_{T_S} (V_o - V_{in})} \qquad (6)$$

Thus, as can been seen from Equation (6), the proper duty cycle $d_1$ of power converter controller 210 can be determined based on the input voltage $V_{in}$, the inductance L, the PWM period $T_s$, the output voltage $V_o$, and the average diode current per PWM cycle $\langle I_D \rangle_{T_S}$. Here, $V_{in}$ and $V_o$ are monitored by power converter controller 210 through feedback connections 233, 214. PWM period $T_S$ is known because it is set by power converter controller 210 and typically remains constant throughout operation. Inductance L can be known, or alternatively, could be measured during a startup calibration sequence. Average diode current $\langle I_D \rangle_{T_S}$ is equivalent to the cumulative average current through LED strings 225 during switching period $T_S$. This average current $\langle I_D \rangle_{T_S}$ can be determined by LED controller 240 from the programmed currents and duty cycles, and is provided to power converter controller 210 via predictive load signal 216. For example, the average current $\langle I_D \rangle_{T_S}$ can be determined by:

$$\langle I_D \rangle_{T_S} = \sum_{n=1}^{N} d_{LEDn} i_{LEDn} \qquad (7)$$

where $d_{LEDn}$ is the programmed duty cycle for an LED string n during switching period $T_S$ and $i_{LEDn}$ is the programmed current through the LED string n during switching period $T_S$ for an LED driver 230 driving N LED strings.

Because LED controller 240 obtains the programmed currents and duty cycles for a subsequent duty cycle of the switching power converter 220 in advance, the LED controller 240 can also calculate the average diode current $\langle I_D \rangle_{T_S}$ for the subsequent duty cycle in advance and provide this information in the predictive load signal 216. Thus, the power converter controller 210 can anticipate the appropriate control settings for a future duty cycle in advance of the duty cycle and need not solely rely on the sensed feedback voltage $V_{FB}$.

In alternative embodiments, a different type of switching power converter 220 may be used. For example, switching power converter 220 may comprise a buck converter, a buck-boost converter, a flyback converter, or other type of switching converter. Furthermore, power converter controller 210 may control switching power converter 220 in various operating modes including discontinuous conduction mode as described above or a continuous conduction mode. Additionally, different control mechanisms may be used to control the switching power converter 220 including, for example, pulse width modulation as described above or pulse frequency modulation. Although the precise calculations described above may vary depending on the type of converter used, the operational mode, and the control mechanism, the general principles can be applied a wide variety of systems.

LED Driver

Figure 4:
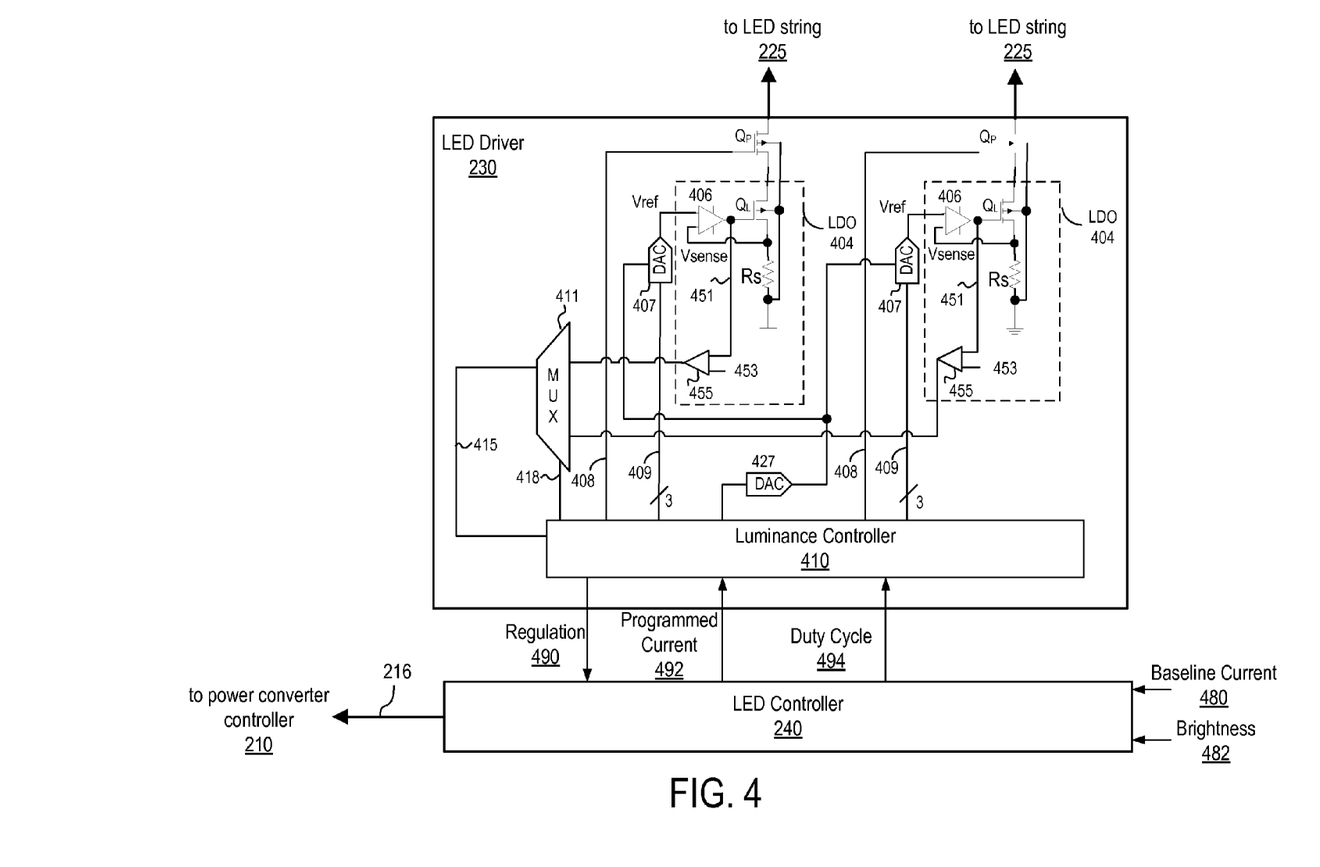
FIG. 4 is a circuit diagram illustrating an embodiment of a LED driver controlled by a LED controller.

FIG. 4 is a circuit diagram of an embodiment of an LED driver 230 controlled by LED controller 240. In each LED channel, LED string 225 is coupled in series with PWM switch $Q_P$ (e.g., an NMOS transistor) for controlling the on-times and off-times of the LEDs in LED channel 225. LED string 225 and PWM Switch $Q_P$ are also coupled in series with low dropout regulator (LDO) 404 for regulating current through LED channel 225. LDO 404 ensures that the peak current in LED string 225 is regulated to a fixed level. LDOs 404 also provide a native power supply rejection that reduces the impact of the boost voltage ripple from Vboost on the luminance of LED strings 225. In each LED channel, LDO 404 dissipates power proportional to the product of the current through LED channel 225, the PWM duty cycle, and the voltage drop across LDO 404.

LED driver 230 includes a luminance controller 410 that controls the brightness of each LED channel independently by controlling PWM switches $Q_P$ via control signals 408 in accordance with duty cycle settings 494 received from the LED controller 240. Duty cycle settings 494 include information that can be used to set the on and off times of the PWM switches $Q_P$, for example, a percentage of time (e.g., 40%, 60%), or a separate duty cycle on time and duty cycle period. Luminance controller 410 also controls the LDOs 404 via control signals 409 and digital-to-analog converters (DACs) 407 in accordance with programmed current levels 492 received from LED controller 240.

Additionally, LDO 404 outputs a regulation feedback signal 415 indicating whether the LDO 404 is out of regulation to luminance controller 410 via multiplexer 411. This regulation feedback 490 is transmitted to LED controller 240, which uses this regulation information 490 to set the programmed current levels 492 through the LED channels 225 during calibration, which is described in greater detail below.

Although FIG. 4 illustrates only two LED channels, LED driver 230 can include circuitry for controlling any number of LED strings 225. Other embodiments of LED driver 230 are shown in U.S. Patent Application Publication No. 2009/0322234 titled "LED Driver with Multiple Feedback Loops" and U.S. application Ser. No. 12/558,275 filed on Sep. 11, 2009 titled "Adaptive Switch Mode LED Driver," the contents of which are incorporated by reference herein in their entirety.

LED controller 240 receives a baseline current setting 480 and brightness setting 482 (e.g., received from the video controller 250 via control signal 207). In another embodiment, the current setting 480 may be received from another source, such as an external resistor that sets the current values. LED controller 240 calculates programmed current levels 492 and duty cycle settings 494 for each LED channel and transmits these settings to the luminance controller 410 of the LED driver 230.

In other embodiments, LED controller 240 may also receive other types of information from the video controller 250, which are then passed on to luminance controller 310. For example, LED controller 240 may receive delay information for each LED channel, which is then communicated to the luminance controller 410. The delay information is used by the luminance controller 410 to delay the on time of PWM switch $Q_P$ during each PWM cycle so that the on times of some LED channels are staggered relative to other LED channels.

Low Dropout Regulator (LDO)

LDO 404 regulates current through the LED strings 225 according to programmed current levels for each LED channel. Each LDO 404 comprises operational amplifier (op-amp) 406, sense resistor $R_S$, and pass transistor $Q_L$ (e.g., an NMOS transistor). Pass transistor $Q_L$ and sense resistor $R_S$ are coupled in series between PWM switch $Q_P$ and a ground terminal. The output of op-amp 406 is coupled to the gate of pass transistor $Q_L$ to control current through the LDO 404. Op-amp 406 receives positive input signal Vref from DAC 407 and receives negative input signal Vsense via a negative feedback loop from the source of pass transistor $Q_L$.

LDO 404 comprises a feedback loop that senses the current through the LED string via Vsense and controls the pass transistor $Q_L$ to maintain the sensed current at the programmed current level set by Vref. Op-amp 406 compares Vref to Vsense. If Vref is higher than Vsense, op-amp 406 increases the gate voltage applied to pass transistor $Q_L$, increasing current flow through sense resistor $R_S$ and LED string 225 until it stabilizes at Vref. If Vsense becomes higher than Vref, then op-amp 406 decreases the gate voltage applied to pass transistor $Q_L$, decreasing current flow through $R_S$ and causing Vsense to drop until it stabilizes at Vref. Thus, LDO 404 uses a feedback loop to maintain Vsense at Vref, thereby maintaining the current through the LED string 425 to a fixed value proportional to Vref. In one embodiment, a sample and hold circuit (not shown) maintains the Vsense voltage level even when the PWM switch $Q_P$ is off.

LDO 404 additionally includes a comparator 455 that compares the output 451 of op-amp 406 to a reference voltage 453 and outputs the resulting signal to the multiplexer 411. The output of the comparator 455 indicates whether the current through the LDO is out of regulation. For example, if the DAC setting is too high for the LDO to maintain the current at the programmed level due to insufficient Vboost 245 voltage at the top of the LED string 225, the output of the op-amp 406 will ramp up to a level above the reference voltage 453. In other alternative embodiments, input 451 to comparator 455 can be coupled to the drain or source of LDO transistor $Q_L$ instead of to the output of op-amp 406.

Luminance Controller and LED Controller

Luminance controller 410 and LED controller 240 work together to monitor characteristics of each LED channel and to set the peak currents and PWM duty cycles to maintain brightness matching between LED channels and optimize power efficiency. For each LED channel, luminance controller 410 receives programmed current levels 492 and duty cycle settings 494 from LED controller 240. Luminance controller 410 then outputs control signals 408, 409, 418 to control LDOs 404, PWM switches $Q_P$, and multiplexer 411, respectively. Luminance controller 410 also receives the regulation feedback signal 415 from LDOs 404 and transmits the regulation feedback 390 to the LED controller 240.

Control signals 409 digitally set the outputs of DACs 307, which in turn provides the analog reference voltage Vref that sets the programmed current through LED strings 225. In one embodiment, control signal 409 is a 3 bit DAC word that allows for 8 possible programmable currents. For example, in one embodiment each LED channel can be set for a current in the range 40 mA to 54 mA in 2 mA increments. The programmed current level is determined by the processing device 210 for each LED channel 225 during a calibration stage as will be described below. Luminance controller 410 controls each LED channel independently such that different LED channels can be configured for different programmed currents by the processing device 210.

In one embodiment, the resolution of the DAC 407 is only 3 or 4 bits. To allow for a large dynamic range of current operation, another DAC 427 produces the seed reference for each DAC 407. The DAC 427 is used to set the base level that will be used when the DAC 407 is digitally set to zero by control signal 409. DAC 427 may have, for example, a 10 bit resolution for better control of the range of currents in the LED channels.

Control signals 408 digitally control PWM switches $Q_P$ for each LED channel according to duty cycle settings 494 for the LED channel. LED controller 240 determines the duty cycle settings 494 for each LED channel as a function of the programmed current 492, baseline current setting 480, and brightness setting 482 during a calculation process as will be described below in greater detail. Luminance controller 410 controls the duty cycle of each LED channel 225 independently such that different LED channels 225 can be configured for different PWM duty cycles by the processing device 210. The duty cycle settings 494 and programmed current 492 for a given LED channel collectively determine the brightness of the LEDs in the LED channel.

Control signal 418 controls switching of multiplexer 411. Luminance controller 410 sequentially monitors feedback signals from the different LED channels by switching the select line 418 of the multiplexer 411. Alternatively, luminance controller 410 can monitor the feedback signals from the different LED channels without the use of a multiplexer 411. The luminance controller 410 passes the regulation feedback 490 to the processing device 210 for use in the calibration stage described in more detail below.

LED controller 240 receives a brightness input 482 that specifies a relative brightness $BI_n$ for each LED channel n. In one embodiment, the brightness input $BI_n$ expresses the desired relative brightness for each LED channel n as percentage of a predefined maximum brightness (e.g., $BI_1$=60%, $BI_2$=80%, $BI_3$=100%, etc). The processor uses the brightness input $BI_n$ as a baseline duty cycle for the channel because the brightness output of a channel is directly proportional to the duty cycle. Thus, for example, a brightness input $BI_n$ of 60% indicates a baseline duty cycle for the channel n of 60% of the maximum duty cycle (corresponding to the maximum brightness). However, LED controller 240 modifies this baseline duty cycle by a compensation factor when determining the duty cycle of PWM switch $Q_P$ to compensate for the known current variations between LED channels and maintain the desired relative brightness. This compensation factor and the resulting duty cycle are determined during the calibration and calculation process described below.

Calibration Stage

LED controller 240 enters a calibration stage at the beginning of operation (e.g., shortly after startup) to determine the programmed current levels for each LED channel. Each LED channel is set independently to compensate for manufacturing variations between the LED channels 225 and maintain the relative brightness outputs between LED channels set by the brightness input 482. Thus, LED controller 240 ensures that channels configured with the same brightness inputs 482 have substantially matching brightness outputs.

Initially, LED controller 240 receives a baseline current setting 480, or Iset level (e.g., Iset=40 mA). LED controller 240 then outputs a current level 492 that causes luminance controller 410 to initialize the DACs 407 to their lowest level. DAC 427 is also initialized to a value corresponding to the baseline current setting. Vboost 245 is then incrementally decreased (via control signal 240) until the one of the LED channels 225 fails to operate at or above the desired Iset (e.g., Iset=40 mA) level. Vboost 245 is then incremented again until all channels again operate in regulation at the desired Iset level. The weakest channel (i.e. the LED channel with the greatest forward voltage drop across the LED string 225) will operate at or near Iset, while other channels may operate at higher current levels due to the different I-V characteristics of the LED strings 402. To monitor the current levels for each LED string 225, the voltage across Rs can be sensed and passed to LED controller 240 (not shown). This information is also available in the form of DAC values from the DAC 407.

Once Vboost 245 reaches the proper level, LED controller 240 sequences DACs 307 for each LED channel from their lowest level to their highest level and monitors the outputs from comparators 455, which indicate the status of regulation. When the DAC 407 output become too high for LDO 404 to maintain the current at the programmed level, the output of op-amp 406 ramps up and exceeds a threshold voltage 453 causing the comparator 455 output to change, which indicates that the channel is no longer in regulation. After a channel is out of regulation, LED controller 240 sequentially decrements the DAC 407 for the LED channel until the channel is back in regulation. LED controller 240 then stores the highest possible DAC setting for the LED channel before the threshold voltage 453 is exceeded as the programmed current level $I_n$ for the LED channel n. This calibration process repeats to determine a programmed current level $I_n$ for each of the LED channels n. During normal operation following calibration, each LED channel n is set to the determined programmed current $I_n$.

The calibration process generally ensures that each LDO 404 is operating below but near the saturation point of each LDO 404 for best power efficiency. In the worst case instances when the saturation current is higher than the maximum DAC setting, the LDO 404 will operate in saturation as near as possible to the interface point between the triode and saturation region of the LDO 404.

In one embodiment, calibration is performed on-the-fly, as opposed to during an initial calibration stage. During on-the-fly calibration, the VBoost 245 voltage is set to a pre-defined voltage level and the DACs 407 are set to their lowest level. As the system is running, the Vboost 245 is decreased at certain time intervals (e.g., every 8 ms) until one or more LED strings 225 fail to operate at or above Iset, and Vboost is again increased to bring the weakest channel back into regulation. Once Vboost 245 reaches the proper level, LED controller 240 sequences DACs 307 for each LED channel in parallel from their lowest level to their highest level and monitors the outputs from comparators 455. The sequencing occurs at certain time intervals (e.g., every 8 ms). When an LED string goes out of regulation, LED controller 240 then stores the highest possible DAC setting for the LED channel before going out of regulation as the programmed current level $I_n$ for the LED channel n. The remaining LED strings continue to be sequenced in the same manner to identify their programmed current levels $I_n$.

Further, the regulation status of the LED channels 225 are constantly monitored by LED controller 240 as the system is running. If an LED channel falls out of regulation, as indicated by the output of comparator 455 and communicated to the processing device 210 via regulation signal 490, LED controller 240 decreases the programmed current level for that LED channel until it falls back into regulation. Additionally, LED controller 240 can periodically increment the programmed current levels 492 to determine if they should be increased. If the LED channel 225 stays in regulation at the higher current level, the new DAC setting for the LED channel 225 is stored by LED controller 240 as the new programmed current level $I_n$ for the LED channel n.

In other embodiments, all or part of the calibration may be performed by the luminance controller 410 with reduced interaction by LED controller 240. In one embodiment, switching power converter 220 is directly controlled (not shown) by the luminance controller 410. Luminance controller 410 receives Iset from LED controller 240 or video controller 250. Luminance controller 410 sets VBoost 245 so that the weakest channel is operating at or near Iset. Luminance controller 410 then sequences the DACs 407 until the optimal DAC 407 settings are identified. However, performing calibration in the luminance controller 410 is not as advantageous as performing calibration in LED controller 240 because it requires additional control circuitry to be added to the luminance controller 410.

Duty Cycle Calculations

Based on the programmed current level $I_n$ determined for each LED channel n, the processing device 210 determines a PWM duty cycle (PWM_out$_n$) for each LED channel n using the following equation:

$$\text{PWM\_out}_n = BI_n \frac{Iset}{I_n} \quad (1)$$

where $BI_n$ is the baseline duty cycle representing the desired relative brightness setting for the channel n and Iset is the predefined baseline current level. Equation (1) scales this baseline duty cycle by the compensation factor $$\frac{Iset}{I_n}$$

to compensate for the current variations between channels and maintain the desired relative brightness. During normal operation, LED controller 240 provides PWM_out$_n$ as the duty cycle settings 494 for the channel n to the luminance controller 410. Luminance controller 410 then drives the PWM switch $Q_P$ via control signal 408 according to the duty cycle settings 494 for each channel n.

An example is now provided to further illustrate operation of the LED controller 240 and luminance controller 410. In this example, the PWM brightness input 482 sets the relative brightness $BI_n$ of each channel n to 60% brightness. The current setting input 380 sets the baseline current setting Iset to 40 mA. During the calibration stage described above, LED controller 240 determines programmed current levels 492 for each LED channel and communicates the programmed current levels 492 to the luminance controller 410. Luminance controller 410 then sets the programmed current levels via control signal 409 and DACs 407. In this example, LED controller 240 sets a first LED channel to a current level of $I_1$=46 mA, a second LED channel to a current level of $I_2$=40 mA and a third LED channel to a current level of $I_3$=42 mA such that each LED channel operates near but below their saturation points. LED controller 240 applies equation (1) to the programmed current levels to determine the duty cycles PWM_out$_n$ for each LED channel n as follows:

$$\text{PWM\_out}_1 = BI_1 \frac{Iset}{I_1} = 60\% \frac{40 \text{ mA}}{46 \text{ mA}} = 52.2\% \quad (2)$$

$$\text{PWM\_out}_2 = BI_2 \frac{Iset}{I_2} = 60\% \frac{40 \text{ mA}}{40 \text{ mA}} = 60\% \quad (3)$$

$$\text{PWM\_out}_3 = BI_3 \frac{Iset}{I_3} = 60\% \frac{40 \text{ mA}}{42 \text{ mA}} = 57.1\% \quad (4)$$

Thus, the calibration and calculation processes determine currents $I_n$ and duty cycles PWM_out$_n$ for each LED channel n. Beneficially, each LED channel will have the same average current (PWM_out$_n$×$I_n$=24 mA). Therefore, the observed brightness of each LED channel will be well matched because brightness output is closely related to the average current through the LED channel.

If the relative brightness inputs $BI_n$ 482 are set differently for different channels n, then equation (1) ensures that the ratio between the average currents of different channels matches the ratio between the brightness inputs. For example, if a fourth channel is configured for a brightness input $BI_4$=75% and a fifth channel is configured for a brightness input $BI_5$=25%, then LED controller 240 calibrates the channels such that the ratio of average currents between the fourth and fifth channel is 3:1.

Performing the brightness calculations in LED controller 240 as opposed to the luminance controller 410 is beneficial for reducing the size and complexity of the luminance controller 410. The circuitry for performing such duty cycle calculations can occupy a significant amount of space in an LED driver. However, in many systems that use LED drivers, such as televisions and monitors, a LED controller 240 that is capable of performing such calculations is already an existing component of the system. These existing system resources can thus be leveraged to simplify the implementation of an adaptive switch LED driver. Further, LED controller 240 may be programmable via firmware or otherwise, which allows for easy updating of the formulas for calculating brightness without any hardware changes.

In another embodiment, LED controller 240 calculates a duty cycle on time of the PWM switches $Q_P$ from PWM_out$_n$ with the following equation:

$$T\text{on}_n = PWM\_out_n \times T\text{period} \quad (5)$$

where Ton$_n$ represents the duty cycle on-time for a switch $Q_P$ in channel n and Tperiod is the period of one complete duty cycle. Stated differently, Ton$_n$ and Tperiod are the representation of the duty cycle PWM_out$_n$ separated into two separate time components. Ton$_n$ and Tperiod can be measured in any unit of time, such as seconds or clock cycles. For example, if PWM_out$_n$ is 40% and Tperiod is 1000 clock cycles, Ton$_n$ is 400 clock cycles. In one embodiment, Tperiod can be determined by LED controller 240 in any of a number of ways, for example, from predetermined settings or from settings received from the video controller 250.

Ton$_n$ and Tperiod are communicated to the LED driver 230 as the duty cycle settings 494 for controlling the on and off times of the PWM switches $Q_P$. Communicating the duty cycle settings 494 to the LED driver in the form of Ton$_n$ and Tperiod, as opposed to PWM_out$_n$ is advantageous because it allows additional processing circuitry for converting PWM_out$_n$ into a Ton$_n$ time to be removed from the LED driver 230.

Luminous Transfer Function Compensation

Figure 5:
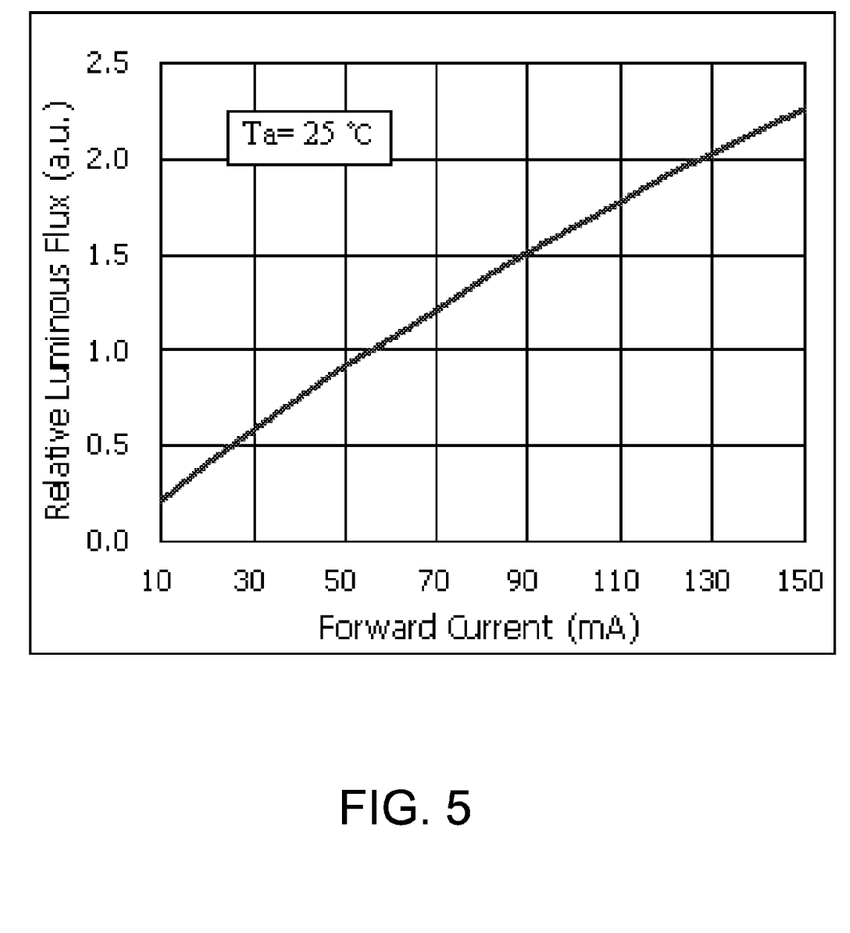
FIG. 5 is a plot illustrating a typical nonlinear transfer function between electrical current and optical luminance for a typical LED.

In an alternative embodiment, LED controller 240 applies a modified version of equation (1) to account for non-linearity in the relationship between the luminous flux and the forward current of the LEDs. FIG. 5 is a plot of the relative luminous flux emitted from a forward conducting LED as a function of current. The plot illustrates that the optical efficiency drops as the forward current increases, and this causes a slight reduction in the slope. In one embodiment, LED controller 240 models the luminance transfer function using a second ordered polynomial of the following form:

$$\text{lum}(x) = c_2 x^2 + c_1 x + c_0 \quad (6)$$

where the $c_0$, $c_1$, and $c_2$ are experimentally determined constants. In this embodiment, processing device 210 applies the following compensation equation to determine PWM_out$_n$ for each LED channel n:

$$\text{PWM\_out}_n = BI_n \frac{lum(Iset)}{lum(I_n)} \quad (7)$$

In contrast to equation (1) above which matches the ratio of average currents between LED channel to the ratio of the brightness inputs $BI_n$, equation (7) instead sets the relative luminous flux output of an LED channel proportionally to the relative brightness $BI_n$. This provides for more precise maintenance of the relative brightness outputs between LED channels. Thus, LED channels configured with the same brightness inputs will have substantially the same brightness outputs.

In one embodiment, LED controller 240 evaluates the ratio $$\frac{lum(Iset)}{lum(I_n)}$$

for each LED channel n during the calibration stage, and stores the results in memory. During real-time operation, LED controller 240 only needs to perform the one remaining multiply operation of equation (7) whenever brightness input 482 is updated.

Temperature Compensation

Figure 6:
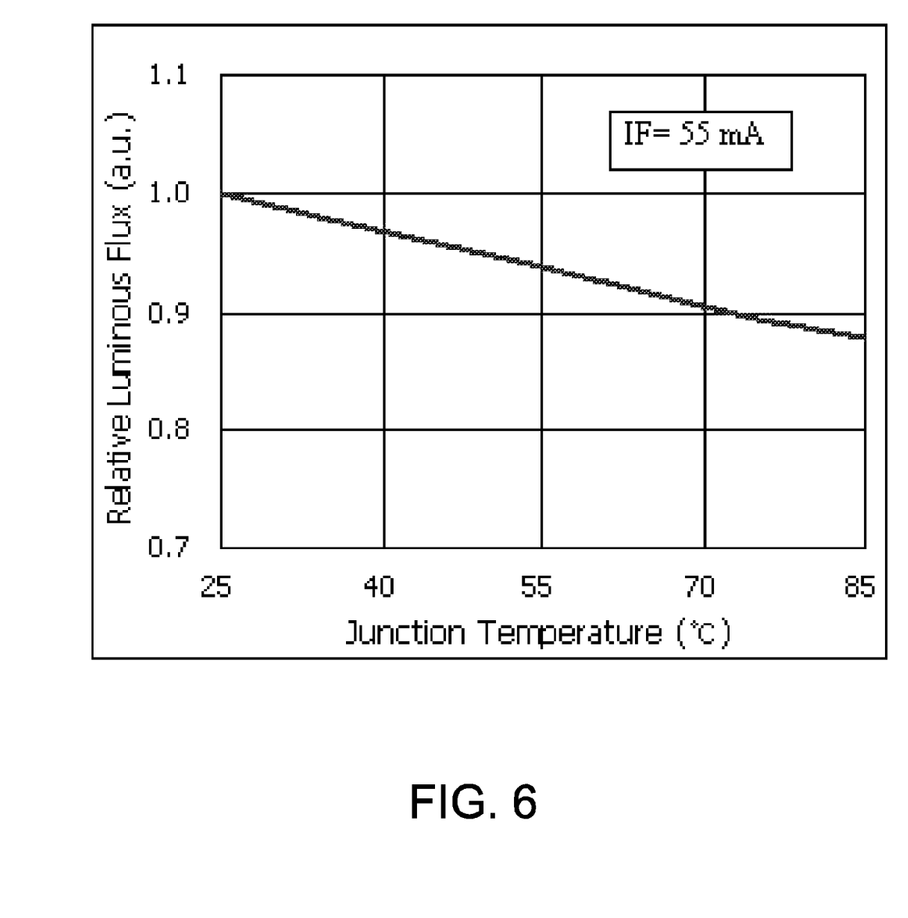
FIG. 6 is a plot illustrating a typical temperature de-rating of luminous flux density as a function of junction temperature for a typical LED.

In another alternative embodiment, LED controller 240 applies a different modified version of equation (1) that additionally provides compensation for temperature variations between the LED channels. FIG. 6 is a plot of the relative luminous flux density emitted from a forward biased LED with 55 mA forward current as a function of junction temperature. The plot illustrates an approximately 12% reduction in luminance as the junction temperature of the LEDs is raised from 25 to 85 degrees centigrade. This reduction is a substantially linear function of temperature. Thus, in one embodiment processing device 210 applies the following equation to determine PWM_out$_n$ for each LED channel n:

$$\text{PWM\_out}_n = BI_n \frac{lum(Iset)}{lum(I_n)C_T} \qquad (8)$$

where $C_T$ is an experimentally determined linear function of temperature. In this embodiment, LED controller 240 is modified to include an additional temperature input signal (not shown) configured to receive temperature data for the LED strings 225. The temperature data can be obtained using any conventional LED temperature measurement techniques.

Upon reading this disclosure, those of skill in the art will appreciate still additional alternative designs for the LED system. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for controlling a switching power converter powering one or more LED strings, the method comprising:
   receiving, during a first switching cycle of the switching power converter, an updated brightness setting for controlling brightness of the one or more LED strings during a second switching cycle of the switching power converter subsequent to the first switching cycle, the updated brightness setting different from a present brightness setting controlling the brightness of the one or more LED strings during the first switching cycle;
   generating based on the updated brightness setting, during the first switching cycle of the switching power converter, a predicted load signal representing a predicted load of the one or more LED strings during the second switching cycle of the switching power converter;
   determining a duty cycle for driving the switching power converter during the second switching cycle based on the predicted load signal received during the first switching cycle; and
   controlling the switching power converter during the second switching cycle using the determined duty cycle to generate an output voltage powering the one or more LED strings.

2. The method of claim 1, further comprising:
   sensing the output voltage of the switching power converter during the second switching cycle;
   comparing the sensed output voltage to a desired regulation voltage; and
   adjusting the duty cycle of the switching power converter to achieve regulation at the output voltage.

3. The method of claim 1, wherein the predicted load signal represents a predicted cumulative average current through the one or more LED strings during the second switching cycle of the switching power converter.

4. The method of claim 1, wherein the predicted load signal is determined from programmed currents through the LED strings and duty cycles driving the LED strings.

5. The method of claim 4, wherein the predicted load signal is based on products of the programmed currents and the corresponding duty cycles for each of the LED strings.

6. The method of claim 1, wherein determining the duty cycle for driving the switching power converter comprises:
   determining the duty cycle based on at least one of: a sensed input voltage to the switching power converter, a sensed output voltage of the switching power converter, an inductance of the switching power converter, a switching period of the switching power converter, and an average cumulative current through the LED strings during the switching period.

7. The method of claim 1, further comprising:
   receiving a baseline current setting for the one or more LED strings; and
   determining programmed current levels through each of the one or more LED strings based on current-voltage characteristics of the one more LED strings and the baseline current setting.

8. The method of claim 7, further comprising:
   determining duty cycles for driving each of the one or more LED strings based on the updated brightness setting and the programmed current levels.

9. The method of claim 8, further comprising:
   outputting the determined duty cycles and programmed current levels to an LED driver via a communication channel, wherein the LED driver drives the LED strings according to the duty cycles and the programmed current levels.

10. The method of claim 1, further comprising:
    receiving the updated brightness setting from a video controller once per vertical synchronization cycle of the video controller; and
    updating the predicted load signal once per vertical synchronization cycle responsive to receiving the updated brightness setting.

11. The method of claim 1, further comprising:
    receiving an input voltage; and
    regulating the input voltage to produce a regulated output voltage powering the one or more LED strings, wherein the control signal controls switching of the switching power converter to achieve regulation at the output voltage.

12. A system for driving one or more light-emitting diode (LED) strings, the system comprising:
    an LED controller coupled to receive, during a first switching cycle of a switching power converter, an updated brightness setting for controlling brightness of the one or more LED strings during a second switching cycle of the switching power converter and generating a predicted load signal representing a predicted load of the one or more LED strings operating at the updated brightness setting different than a present brightness setting controlling brightness of the one or more LED strings during the first switching cycle of the switching power converter, the second switching cycle being subsequent to the first switching cycle; and
    a power conversion controller coupled to receive the predicted load signal from the LED controller during the first switching cycle of the switching power converter and generate a control signal based on the predicted load signal received during the first switching cycle, the control signal having a duty cycle for controlling switching of the switching power converter during the second switching cycle, the switching power converter providing power to the one or more LED strings.

13. The system of claim 12, wherein the power conversion controller is further configured to sense a regulated output voltage of the switching power converter and adjusting the duty cycle of the switching power converter to achieve regulation at the regulated output voltage.

14. The system of claim 12, wherein the predicted load signal represents a predicted average cumulative current through the one or more LED strings during the second switching cycle of the switching power converter.

15. The system of claim 14, wherein the predicted load signal is based on products of the programmed currents and the corresponding duty cycles for each of the LED strings.

16. The system of claim 12, wherein the predicted load signal is determined from programmed currents through the LED strings and duty cycles driving the LED strings.

17. The system of claim 12, wherein the power conversion controller determines the duty cycle for driving the switching power converter based on a sensed input voltage to the switching power converter, a sensed output voltage of the switching power converter, an inductance of the switching power converter, a switching period of the switching power converter, and an average cumulative current through the LED strings during the switching period.

18. The system of claim 12, wherein the LED controller is configured to determine programmed current levels through each of the one or more LED strings based on current-voltage characteristics of the one more LED strings.

19. The system of claim 18, wherein the LED controller is further configured to determine duty cycles for driving each of the one or more LED strings based on the updated brightness setting and the programmed current levels.

20. The system of claim 19, further comprising:
a communication channel for communicating between the LED controller and an LED driver, wherein the LED controller outputs the determined duty cycles and programmed current levels to the LED driver via the communication channel.

21. The system of claim 12, wherein the LED controller receives the updated brightness setting from a video controller once per vertical synchronization cycle of the video controller and updates the predicted load signal once per vertical synchronization cycle responsive to receiving the updated brightness setting.

22. The system of claim 12, further comprising:
the switching power converter receiving the control signal from the LED controller and regulating an input voltage to produce a regulated output voltage powering the one or more LED strings, wherein the control signal controls switching of the switching power converter to regulation at the output voltage.

23. A method for controlling a switching power converter powering one or more LED strings, the method comprising:
receiving a brightness setting from a video controller once per vertical synchronization cycle of the video controller;
generating, during a first switching cycle of the switching power converter, a predicted load signal once per vertical synchronization cycle responsive to receiving the brightness setting, the predicted load signal representing a predicted load of the one or more LED strings during a second switching cycle of the switching power converter, the second switching cycle being subsequent to the first switching cycle;
determining a duty cycle for driving the switching power converter during the second switching cycle based on the predicted load signal received during the first switching cycle; and
controlling the switching power converter during the second switching cycle using the determined duty cycle to generate an output voltage powering the one or more LED strings.

24. The method of claim 23, wherein generating the predicted load signal comprises:
receiving a baseline current setting for the one or more LED strings;
determining programmed current levels through each of the one or more LED strings based on current-voltage characteristics of the one more LED strings and the baseline current setting; and
generating the predicted load signal based in part on the programmed current levels.

25. The method of claim 24, further comprising:
determining duty cycles for driving each of the one or more LED strings based on the brightness setting and the programmed current levels; and
generating the predicted load signal further based in part on the duty cycles.

* * * * *